United States Patent [19]

Stensaas

[11] Patent Number: 4,581,846
[45] Date of Patent: Apr. 15, 1986

[54] SYSTEM AND METHOD FOR THE FERTILIZATION OF FOREST, FARM AND OTHER LARGE PLANT COMMUNITIES

[76] Inventor: Larry J. Stensaas, 2460 Lynwood Dr., Salt Lake City, Utah 84109

[21] Appl. No.: 662,716

[22] Filed: Oct. 19, 1984

Related U.S. Application Data

[63] Continuation-in-part of Ser. No. 474,354, Mar. 11, 1983, and Ser. No. 641,341, Aug. 13, 1984.

[51] Int. Cl.$^4$ .................. A01G 29/00; A01N 25/00
[52] U.S. Cl. .................................. 47/58; 47/48.5; 47/1.1; 71/34; 71/64.11; 71/64.13
[58] Field of Search .................. 47/58, 48.5, 1.1; 71/6–7, 32, 64.11, 64.13

[56] References Cited

U.S. PATENT DOCUMENTS

| | | | |
|---|---|---|---|
| 4,155,737 | 5/1979 | Dommergues et al. | 71/7 |
| 4,224,048 | 9/1980 | Pendergast | 47/48.5 X |
| 4,294,037 | 10/1981 | Mosse et al. | 47/59 |
| 4,345,403 | 8/1982 | Giovannetti | 47/58 X |

*Primary Examiner*—Robert E. Bagwill
*Attorney, Agent, or Firm*—Workman, Nydegger & Jensen

[57] ABSTRACT

A large first package, and method of its production, for providing soluble plant macronutrients and micronutrients in a timed-release form from a contained second package to an extensive plant community. The bale-like first package comprises a biodegradable cellulosic matrix of municipal waste or other energy-rich organic matter within which the second package is supported. The second package contains insoluble rock mineral and rock phosphate particles and bacterial second microorganisms in a nourishing and hydrated microenvironment which allows the microorganisms to grow, and to produce enzymes and organic acids which act on the mineral particles and thereby create soluble nutrient compounds. Alternatively, the second package contains commercially refined fertilizers packaged to dissolve in a timed-release fashion.

The biodegradable package functions as it is introduced onto/into soil in association with vector plants. Upon hydration its microbial components become active so that macronutrients and micronutrients emanating from it are transferred first to the vector plants and thence to a series of recipient plants. Plants linked together by interroot microorganisms which provide for the distribution of nutrients to an extensive plant association and constitute active elements in a "radial cascade" of nutrients along concentration gradients. The microbial interlinked "source" and "sink" plants not only serve to buffer and transfer nutrients, but they also protect the soluble nutrient compounds from adsorption and loss to soil constituents.

21 Claims, 9 Drawing Figures

SYSTEM AND METHOD FOR THE FERTILIZATION OF FOREST, FARM AND OTHER LARGE PLANT COMMUNITIES

RELATED APPLICATIONS

This application is a continuation-in-part application of my copending applications Ser. No. 06/474,354, filed Mar. 11, 1983 for "Plant Fertilization Using a Microbiological System for Phosphorus Extraction and Distribution," and Ser. No. 06.641,341, filed Aug. 13, 1984 for "Microbiological Systems for Phosphate Extraction and Distribution to Plant Root Systems."

THE FIELD OF THE INVENTION

The present invention relates to plant fertilization systems and methods, and, more particularly, to a novel system and method for fertilizing large plant communities from a central nutrient source utilizing microbial organic acid and enzyme conversion of insoluble rock minerals to soluble nutrients and microbial interplant nutrient transfer.

THE PRIOR ART

It is well-known that phosphorus, calcium, and potassium are among the 17 elemental constituents essential for plant growth, that they must be in a soluble form in order to be utilized by plants, and that most soils are deficient in one or more of these soluble constituents. In order to satisfy the continuing need for macronutrients and micronutrients, commercial refinement processes are utilized. Such processes are not only complex and energy-intensive, but they require "high-grade" sources whose natural concentrations are being depleted. A further problem arises in fertilizing large plant communities, such as forests, which concerns not only the cost of the refined fertilizers, but the additional expense of distributing them on a large scale. In the case of soluble phosphorus applied as fertilizer, a high proportion is lost due to irreversible adsorption by clay, metals, and other soil constituents before entry into the plants to be fertilized. A further problem which may occur with the direct application of commercial fertilizers and some sewage is a condition of toxicity which occurs when nutrient levels within plants at the site of application exceed normal values. This is not only true of macronutrients such as phosphorus, nitrogen and potassium, but is also the case for micronutrients and especially trace metals, in sewage sludge from industrial sources.

In seeking to overcome the problems outlined above, attempts have previously been made to utilize municipal wastes, or unrefined sources of rock minerals or microorganisms, or combinations thereof in a soil environment near plant root systems to improve the availability of soluble forms of macronutrients and micronutrients to plants. These attempts have been based on the understanding that the soluble compounds are made available to plants by the breakdown of natural minerals and organic constituents through the action of microorganisms. Such attempts are reflected in the disclosure of U.S. Pat. Nos. 947,765, 1,361,597, and 4,155,737.

Although some of the prior attempts to overcome the above-described problems have been able to provide a source of nutrients, they generally depend on the availability of a concentrated organic or inorganic source and their application in a widely distributed fashion to the plants to be fertilized. Furthermore, the fact that soils of temperate climates have a neutral or alkaline soil pH does not provide conditions conducive to the spontaneous conversion of insoluble to soluble nutrient compounds. Soils in most tropical climates although of acid pH frequently contain metals and argillaceous constituents which rapidly adsorb nutrients and render them unavailable to plants.

What is needed for a full and workable solution to the problem of supplying soluble macronutrients and micronutrients is a method for recycling them from urban and commercial wastes, a method of utilizing unrefined sources of naturally occurring rocks and minerals as fertilizer, a means for avoiding adsorptive loss to clay minerals within the surrounding soil, a means for supplying such nutrients over extended time periods, and a method to continuously fill the nutritional requirements of extensive plant communities such as those of forests, savannahs, cities and farms from central locations instead of the usual method of applying fertilizers in a continuous, sheet-like fashion.

BRIEF SUMMARY AND OBJECTS OF THE INVENTION

A system of fertilization is described in which the extraction of plant nutrients from insoluble sources and their distribution to plants utilize distinctive assemblages of microorganisms to effect the desired changes. I propose a centralized system involving the conversion of insoluble organic and mineral compounds to soluble plant nutrients by means of first microorganisms living within the cellulosic matrix of a large package. The system utilizes second microorganisms interconnecting plant roots to distribute the nutrients in a "radial cascade"; mycorrhizal and actinomycete second microorganisms thus serve as agents of nutrient equalization between plants. The collective action of the package and microorganisms results in fertilization of an extensive plant community from a central source without the loss of nutrients through adsorption to clay minerals and other soil constituents during the distribution process.

A key component, the first package or bale, contains multiple microbiological environments within which energy-rich substrata are used by microorganisms whose products convert insoluble minerals to soluble plant nutrients and chelate potentially harmful metals. Thus, organisms utilize the cellulosic matrix of the bale as a suitable growth environment within which to produce organic acid and enzymes which then act upon rock minerals and rock phosphate. The bale may also contain refined soluble nutrients in a time-release form as a second package. The large size of the bale provides for sustained release of nutrients over a prolonged period of time.

After introduction of the bale or large first package onto soil or other growth environments and penetration by moisture, it begins to liberate soluble nutrients so that "afferent" roots of a vector plant or plants absorb them. After becoming distributed within the vector plant, nutrients are then translocated to nearby plants by symbiotic mycorrhizal fungal and/or actinomycete microorganisms. The ability of these thread-like microorganisms to effect interplant transfer is due to interroot hyphae. However, soil hyphae also help to obtain nutrients appearing in the soil solution and exudates of plants surrounding the central nutrient source.

A "radial cascade" of nutrients from the bale first package ensues as the nutrients within vector plants are transferred down a gradient into the root systems of adjacent nutrient-deficient "sink" plants. Microorganisms which interconnect roots of vector "source" plants to afferent roots of second, third, fourth, etc. order "sink" plants allow nutrient distribution to an extensive plant community. Since each step of this sequential transfer of nutrients is accomplished primarily through plants and microorganisms which exist in natural symbiotic relationship, there is essentially no loss of the soluble phosphorus to clay minerals, metals, and other adsorptive components of the soil, and even nutrients in root exudates are reclaimed.

It is, therefore, a primary object of the present invention to use solid and liquid municipal wastes as a source of materials to create an environment within which biological conversion of insoluble, unrefined nutrient-rich rocks, minerals and organic matter into soluble compounds occurs, and to employ the "radial cascade effect" for transferring nutrients from a central source of one or more bales through perennial vector plants to communities of annual and other perennial plants without substantial loss of the nutrients to clay, metals and other adsorptive minerals in the surrounding soil.

Another object of the present invention is to provide a long-term nutrient source from solid and liquid municipal wastes so as to recycle such nutrients and to do so subject to a time-release mechanism so that damage to plants from high or toxic nutrient concentrations can be avoided.

Still another object of the present invention is to provide a means for introducing a source of nutrients in conjunction with plants whose extensive root systems are interconnected with symbiotic microorganisms so as to facilitate interplant nutrient transfer and to distribute nourishment to a large series of plants.

Still a further object of the present invention is to provide a first package in conjunction with one or more vector plants which serve as a reservoir, buffer and transportation means so that nutrients may be successfully transmitted through such plants and their attached, nutrient-tolerant interroot microorganisms.

These and other objects and features of the present invention will become more fully apparent from the following description and appended claims, taken in conjunction with the accompanying drawings.

DETAILED DESCRIPTION OF THE PREFERRED EMBODIMENTS

1. General Discussion

Figure 1:
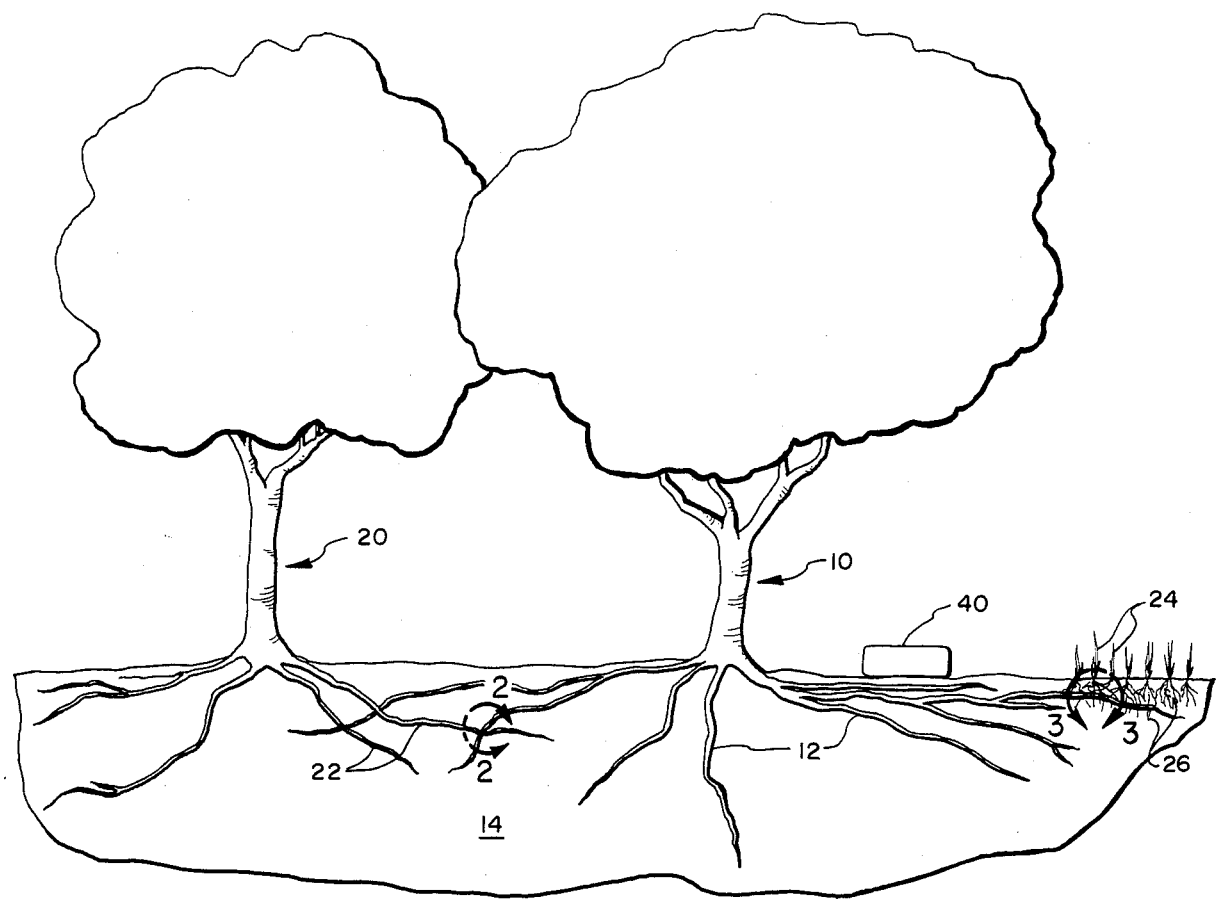
FIG. 1 is a schematic representation of one presently preferred embodiment of the present invention as it functions in conjunction with the root systems of perennial plants.

In attempts to avoid the problems of nutrient deficiency in plants, certain microorganisms have been shown to secure soluble nutrients from the soil and to introduce them into the root system of plants. In such attempts it has been discovered that various types of thread-like microorganisms known as mycorrhizal fungi (MF) and actinomycete bacteria (AB) are capable of obtaining soluble forms of phosphorus, calcium, potassium and other elements from the surrounding soil. It is known that the root system of most perennial plants supports an extensive symbiotic community of such thread-like microorganisms. Ectomycorrhizal fungi predominate on certain trees and herbaceous plants; endomycorrhizal fungi are common on annual and perennial plants of all sizes, including crop plants, and actinomycete bacteria favor the roots of particular temperate and tropical plants. It is also known that fungal microorganisms establish a symbiotic relationship with the plant root such that cells of the root cortex provide carbohydrates and nourishment for the fungus, and the fungus, in return, provides phosphorus and other elements to the plant. Some fungi extend into the soil surrounding a root up to distances of 10 centimeters and secure nutrients and water which they transfer through their cytoplasm by a process of translocation. Microorganisms of the same or different species also interconnect the roots of plants and are capable of securing macronutrients and micronutrients from a plant which has relatively high levels ("source" plant) and delivering them to plants which are deficient ("sink" plants) so as to establish a balance between them. I refer to this component of the "radial cascade effect" as the mycorrhizal-actinomycete nutrient equalization process with the understanding that root exudates containing nutrients may also play a role in this process of nutrient exchange among plants.

I propose the creation of a large, biodegradable package of municipal wastes and other organic constituents containing distinctive microbiological compartments whose relationship to one another is configured on biological principles to promote the orderly conversion of (1) cellulose into glucose and other microbial nutrients and (2) particulate rock minerals into soluble plant nutrients. Selected populations of microorganisms living in the moist cellulosic matrix effect the biomass and mineral conversion at a rate consistent with the ability of nearby plants to utilize the released macronutrients and micronutrients. Although such packages consist primarily of unrefined rock minerals and utilize liquid and solid municipal wastes, refined nutrients can also be incorporated as supplements to meet the nutritional requirements of particular plant communities, soil and climatic conditions.

AB and MF microorganisms form interroot connections between both annual and large, perennial plants in such a way as to maintain equilibrium in the distribution of nutrients and water. Such thread-like interplant microorganisms function as agents of nutrient transfer as a consequence of specialized sites of intimate contact between the membranes of MF and AB and plant root cells. A local concentration of nutrients in the soil solution creates a gradient down which redistribution occurs among serially interconnected plants. Thus, a "radial cascade" is created with respect to the source of nutrients in which a wave of nutrients moves sequentially outward to reestablish equilibrium among plants situated around a central source. This "radial cascade effect" permits large numbers of plants to be fertilized by a single application, and it helps to prevent the buildup of toxic levels of nutrients among plants at the site of application.

In view of these concepts, it is proposed to create a large package as a bale or heap within whose cellulosic matrix insoluble sources of plant nutrients are solubilized by microbiological enzymes and organic acids. These soluble components emanating from the central source then fertilize a plant community of large size using the naturally occurring interconnections of AB and MF microorganisms between plants to distribute nutrients down concentration gradients. The use of solid and liquid municipal wastes together with unrefined sources of rock materials serves to recycle and conserve natural resources and provide an economical source of plant nutrients.

2. Structure and Use of the Fertilization System and Method

Reference is now made to the Figures wherein like parts are designated with like numerals throughout. It will be readily appreciated that the components of the present invention, as generally described and illustrated in the figures herein, could be arranged and designed in a wide variety of different configurations. Thus, the following more detailed description of the embodiment of the system and method of the present invention, as represented in FIGS. 1 through 9, is not intended to limit the scope of the invention, as claimed, but it is merely representative of one presently preferred embodiment of the invention.

Referring initially to FIG. 1, the invention is illustrated as it actually functions in conjunction with perennial plants. In this figure, a "source" or "vector" plant, generally designated at 10, is shown in a growth state with a first package 40 and the root system 12 of plant 10. As will be described more fully hereafter, vector plant 10 is one or more perennial plants whose extensive root system 12 overlaps that of other perennial and annual "sink" plants which include trees 20 and grasses or crop plants 24.

Vector "source" plant 10 is an important constituent in this system both with respect to securing nutrients emanating from the first package 40 and for distributing such nutrients to other plants by means of root exudates and interroot MF and/or AB in the soil environment. Vector "source" plant 10 comprises a long-term host for MF and/or AB microorganisms interconnecting "sink" plants 20 and 24 by means of a symbiotic relationship. It may also serve as a host for nutrient-tolerant MF which may be introduced with the first package 40 so as to colonize part of the plant root system.

MF and AB microorganisms which form the basis of the interplant gradient equalization process are capable of balancing nutrient levels between plants. They are nourished by carbohydrates and exudates produced by roots of the plants with which they are associated, and they translocate nutrients from the roots and exudates of plants having a relatively high concentration to those with a low concentration so as to reestablish a condition of dynamic, soluble nutrient equilibrium between them.

Roots 12 of vector "source" plant 10 located below an active bale first package 40 may directly receive or may grow into the matrix 42 of first package 40 (see FIG. 8) and absorb nutrients as they become available. At some point in time, a relatively higher level of nutrients will exist throughout the vector "source" plant 10 such that nutrients will then be taken into the MF or AB and translocated to the root system of "sink" plants 20 and 24 which have a lower level of soluble plant nutrients. Vector plant 10 may be one of several plant varieties having a tolerance for macro and micro nutrients enabling it to continue to grow even in the presence of temporarily supraoptimal levels; by virtue of its large size, the vector plant 10 may serve both as a reservoir and as a buffer for nutrients during transfer of nutrients from the source first package 40 to other plants as the first step in a "radial cascade effect."

Figure 2:
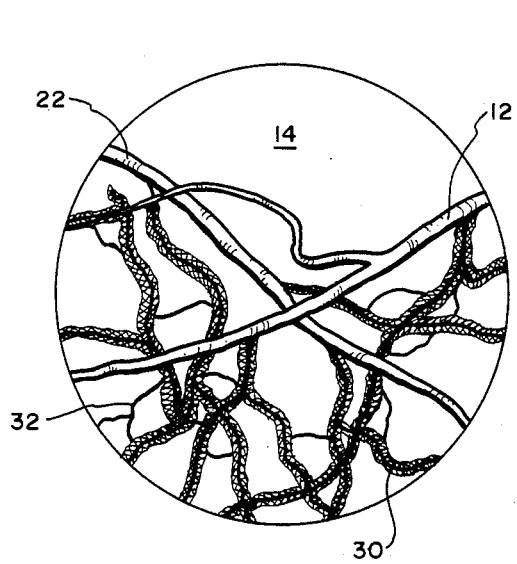
FIG. 2 is a magnified schematic cross-section illustrating that portion of the root systems identified at 2—2 in FIG. 1.
Figure 3:
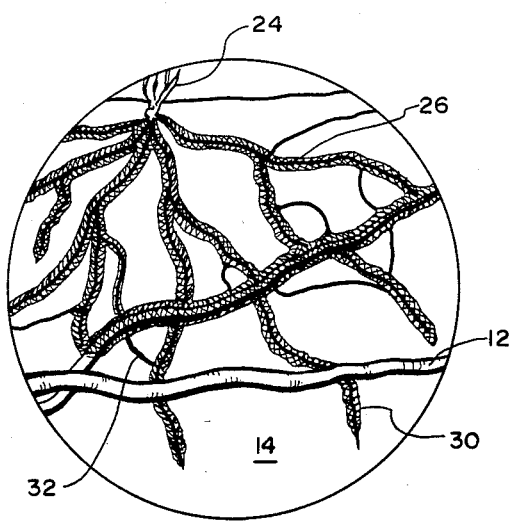
FIG. 3 is a magnified schematic cross-section illustrating that portion of the root systems identified at 3—3 in FIG. 1.

By reference to FIGS. 2 and 3, taken in conjunction with FIG. 1, it is seen that the morphology of MF and AB may appear in several forms. They create specialized associations with the plant roots consisting of an hyphal net 30 or "mycelium" on roots 12, 22 and 26. The hyphal net 30 may absorb nutrients from the soil and from root exudates, and it has specialized, contacts with plant cells in the roots that provide for the exchange of nutrients and water. Thread-like connections between the roots of different plants, termed interroot hyphae 32, also exist which are capable of transferring macro and micronutrients between hyphal nets 30 of different plants. Said interroot hyphae 32 may extend one or more centimeters from the vector plant 10 to encounter the roots of other plants, such as plants 20 and 24 in FIG. 1, thereby establishing a serial interplant symbiotic association.

Through the interroot hyphae 32, MF and AB transfer nutrients by cytoplasmic translocation from a plant containing a higher concentration of nutrients ("source" plant) to one or more plants with a lower concentration ("sink" plant), thus constituting the physical basis for the interplant equalization process as the second step in the "radial cascade effect." In this manner, the MF and AB not only transfer nutrients without adsorptive loss to soil constituents, but they also protect the plants with which they are associated from exposure to excessive nutrient concentrations which could cause plant damage due to high or toxic levels.

Figure 4:
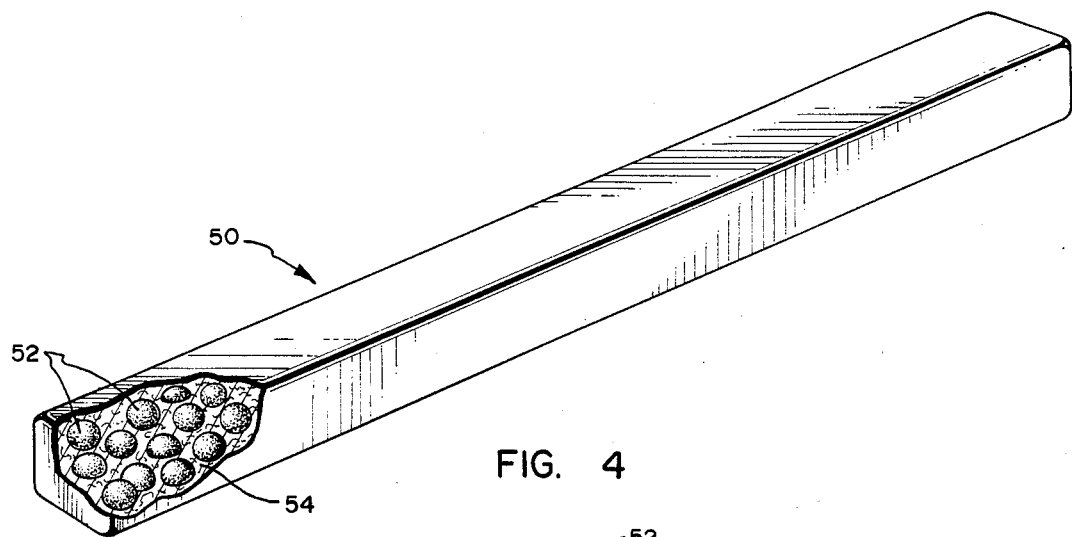
FIG. 4 is a perspective illustration of one presently preferred embodiment of a second nutrient package source containing refined, soluble nutrients in a time-release form, parts of the package being broken away to reveal its internal construction.
Figure 5:
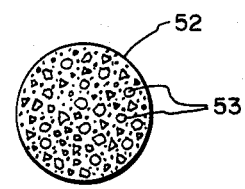
FIG. 5 is a cross-sectional illustration of one presently preferred embodiment of the soluble refined plant nutrients which are contained within the second package illustrated in FIG. 4.

FIG. 4 illustrates the components and general configuration of one source of soluble plant nutrients to be included as an optional or supplementary second package 50 within the first package 40. It consists of commercially refined, soluble macronutrients and micronutrients 53 in a timed-release pellet 52 as shown in FIG. 5. The pellets 52 are embedded within a slowly dissolving material 54 which greatly extends the period during which nutrient release will occur when in its activated form. In practice, exposure to moisture will lead to erosion of the embodiment 54 of the soluble nutrients in such second package 50 and the subsequent release of nutrients from pellets 52 situated superficially in second package 50 with diffusion into the matrix 42 of the first package 40 (see FIG. 8).

Figure 6:
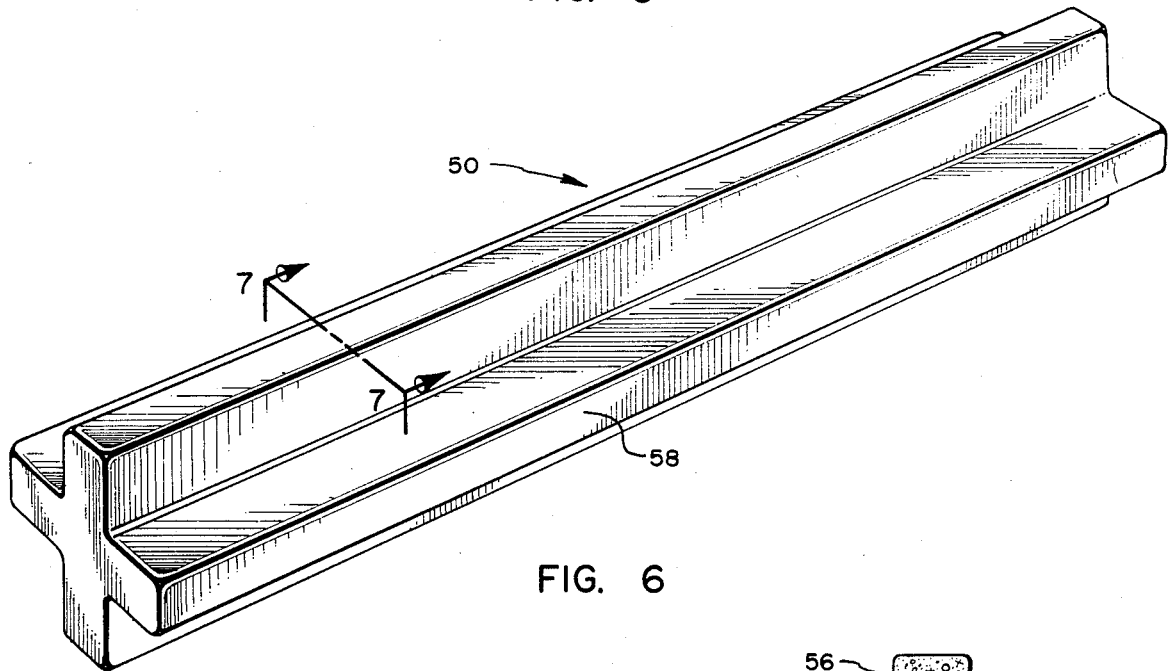
FIG. 6 is a perspective illustration of a rock mineral and rock phosphate source which represents a second preferred embodiment of a second package.
Figure 7:
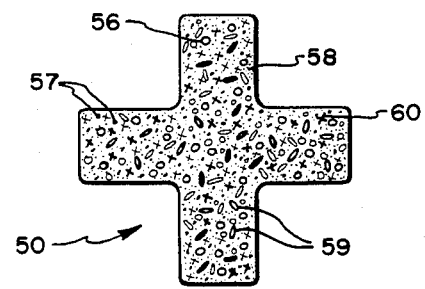
FIG. 7 is a cross-sectional schematic view taken along lines 7—7 of FIG. 6.

In another embodiment, as shown in FIGS. 6 and 7, the second package 50 is formed as a nutrient extraction unit. Its constituents are a hydrogel 59, cellulose 58, rock minerals or rock phosphate 56, and biological organisms 57 and 60 whose products facilitate conversion of the rock particles to soluble macronutrients and micronutrients. Such nutrient extraction unit second package 50 includes a collection of rock mineral and rock phosphate particles 56 which contain insoluble or slightly soluble nutrient-rich compounds having a particle size in the range of from approximately 5 to approximately 50 micrometers. Also within extraction unit second package 50 are microorganisms 60 referred to as cellulase microorganisms which include such species as Trichoderma reesus, Clostridium thermocellum, Trichoderma vivide, Phanaerocha chrysosporium, Schizophyllum commune, and Sporotrichum pulvurulentum. Varieties are selected for use based on their ability to produce endohydrolases and exohydrolases capable of converting cellulose to glucose. Glucose is an energy-rich substratum capable of being utilized by many types of bacterial and fungal microorganisms. Cellulase microorganisms 60 are propagated under growth conditions which include commercial sterile monoculture on liquid and grain media to produce large numbers of organisms in a dormant or ensporulated state. They are then maintained under conditions providing for optimal handling, storage and mixing with other components of the second package 50.

Also within extraction unit second package 50 are microorganisms referred to hereafter as organic acid and enzyme producing bacteria 57 which include genera such as Bacillus and Pseudomonas. Species of bacteria 57 are selected for use based on their ability to produce organic acids, to be grown under the conditions, obtaining in many municipal sewage treatment plants, to ensporulate, to be handled in a dormant form, to germinate in moist aerobic and anaerobic microenvironments, and to efficiently act upon glucose and unrefined biomass and hydrogen 59 energy sources to produce acids and enzymes which solubilize relatively insoluble rock minerals 56 and organic compounds. Bacteria 57 are propagated under growth conditions which include sewage treatment plants and commercial sterile culture in order to provide a large number of specimens in an ensporulated and/or dormant state. The dormant bacteria 57 are then maintained in conditions to provide for optimal handling and storage.

Ensporulated bacteria 57 occur together with other components of sludge which constitute a natural hydrogel. Hydrogel 59 has constituents necessary to sustain the growth of bacteria 57 and cellulase microorganisms 60 following hydration. Hydrogel 59 is mixed with cellulose 58 and other naturally water-absorbent organic materials. When provided with additional nutrients from the matrix of the first package 40 (see FIG. 8), growth of cellulase microorganisms 60 and bacteria 57 may be sustained for periods ranging from months to years. Sludge hydrogen 59 may be supplemented with gel-like cellulosic materials as hydroxymethylcellulose, parts of green plants rich in cytoplasm, or animal manure, or undigested organic components of raw sewage sludge, or plant sugars of large molecular weight which may be combined with germination agents and nutrients such as ribosides, glucose, organic anions, cations, and buffering agents. The materials form hydrophyllic compounds which will become hydrated when exposed to water and favor the growth of bacteria 57 and cellulase microorganisms 60.

The rock mineral and rock phosphate particles 56, cellulase microorganisms 60, bacteria 57, cellulose 58, activated sludge, and other hydrogels 59 are mixed together and then extruded to form rods or pellets having an X-shaped profile, as depicted in FIG. 7. They are formed of a viscous mass so as to avoid injury to the cellulase microorganisms 60 and organic acid producing bacteria 57 during extrusion. The 1 cm wide arms are of a consistency which allows the rod or pellet to maintain its shape during subsequent composting, drying and incorporation into the first package 40.

In use, the nutrient extraction unit second package 50 is included in the first package 40 and may be used immediately while still partially hydrated, or it may be dried and stored. It is easily transportable so long as it is kept cool or dry. Upon prolonged exposure to moisture, extraction unit second package 50 becomes hydrated and its constituents contact the cellulosic matrix 42 of the first package 40 together constituting a growth medium for the propagules of bacteria 57 and cellulase microorganisms 60. Conversion of cellulose to glucose by the action of cellulase microorganisms 60 on first package 40 cellulose and other unrefined nutrient materials makes energy-rich nutrients available to the bacteria 57. The cellulase microorganisms 60 and bacteria 57 do not react with all nutrient components of the first package 40 and second package 50 simultaneously, but rather, the organisms act progressively so that glucose, and organic acids and enzymes for solvation of the rock mineral and rock phosphate particles occurs in a time-release manner.

Figure 8:
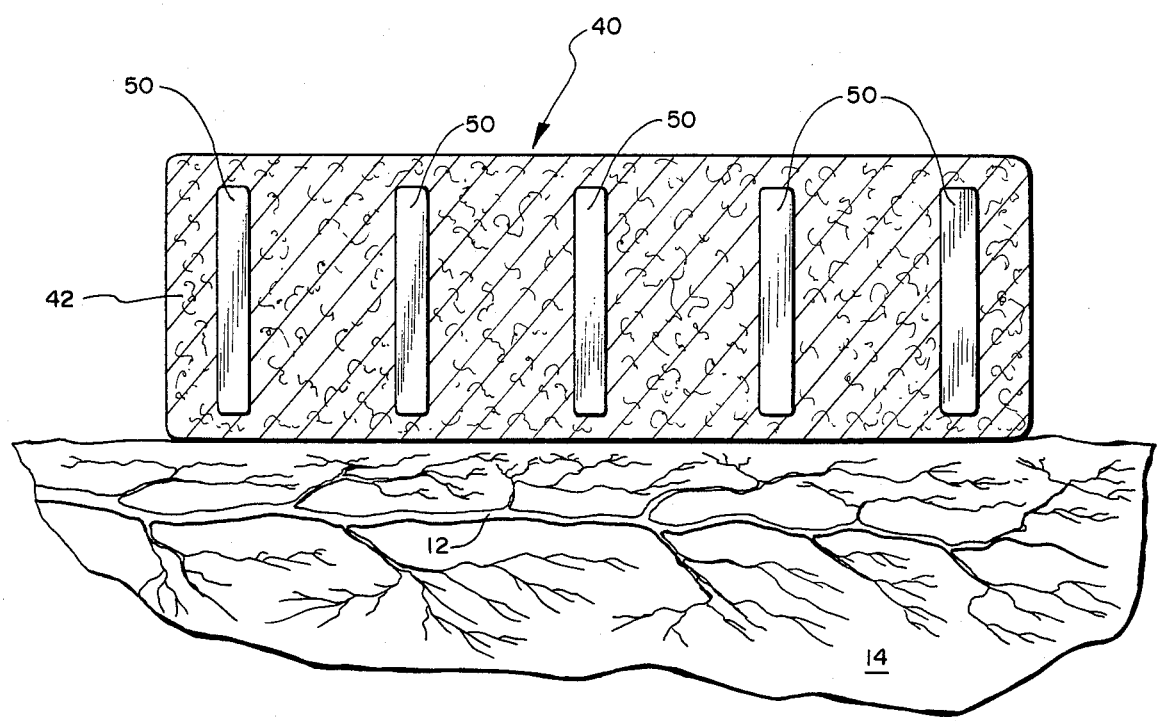
FIG. 8 is a cross-sectional illustration of one presently preferred embodiment of a first package bale as it functions in association with the roots of a vector plant.

A preferred embodiment of a first package 40 for providing soluble plant nutrients is illustrated in FIG. 8. It has the shape of a bale consisting primarily of municipal solid waste organic matter as a cellulosic matrix 42 of the first package 40 and rod-shaped second packages 50 of either/both refined soluble nutrients (see FIG. 4) and/or plant nutrient extraction units (see FIG. 6). The organic matter of matrix 42 may consist of shredded, chipped, and chopped urban waste such as paper products, garbage, grass clippings, wood, plant, litter, textile and other fibrous materials, etc., which are combined in predetermined proportions to give bales of a certain free air space and texture. Alternatively, such organic matter may consist of a variety of dry plant material which is prepared by conventional farm machinery. The first package 40 is configured as bales by bailing machines modified so as to include multiple second packages 50. In use, water applied to the cellulosic matrix 42 creates an environment which activates cellulase microorganisms 60, which produce glucose and stimulate bacteria 57 whose production of organic acids and enzymes aid in the breakdown of insoluble rock mineral particles 56 into soluble nutrient compounds. With time, soluble plant nutrient compounds traverse the matrix 42 to enter the soil 14 where they are taken up by afferent roots 12 of vector plant 10, or they are received by afferent roots 12 of vector plant 10 which grow into bale first package 40. The vector plant 10 conveys the soluble nutrients throughout its vascular system and into its roots 12 which are widely distributed within the soil 14 in such a way as to interdigitate with the root systems of other plants, as those of plants 20 and 24 in FIG. 1. Thread-like microorganisms 32 interconnect plants 10, 20 and 24. They transfer phosphorus from plants with a higher concentration ("source" plants) to plants with a lower concentration ("sink" plants). Thus, if a plant 10 has nutrients in excess of its immediate requirements, some or all of the excess nutrients from plant 10 will be translocated to nutrient-deficient recipient "sink" plants through interroot hyphae 32. In this manner the MF and AB also tend to protect plants near the nutrient source from exposure to excessive amounts of nutrients and plant damage. Further, since the vector plant 10 acts as a large, space-occupying medium through which plant nutrients from the first package 40 are transferred, it buffers the quantity of nutrients received from the first package bale 40, thereby minimizing potential deleterious effects of macronutrient and micronutrient superabundance.

Figure 9:
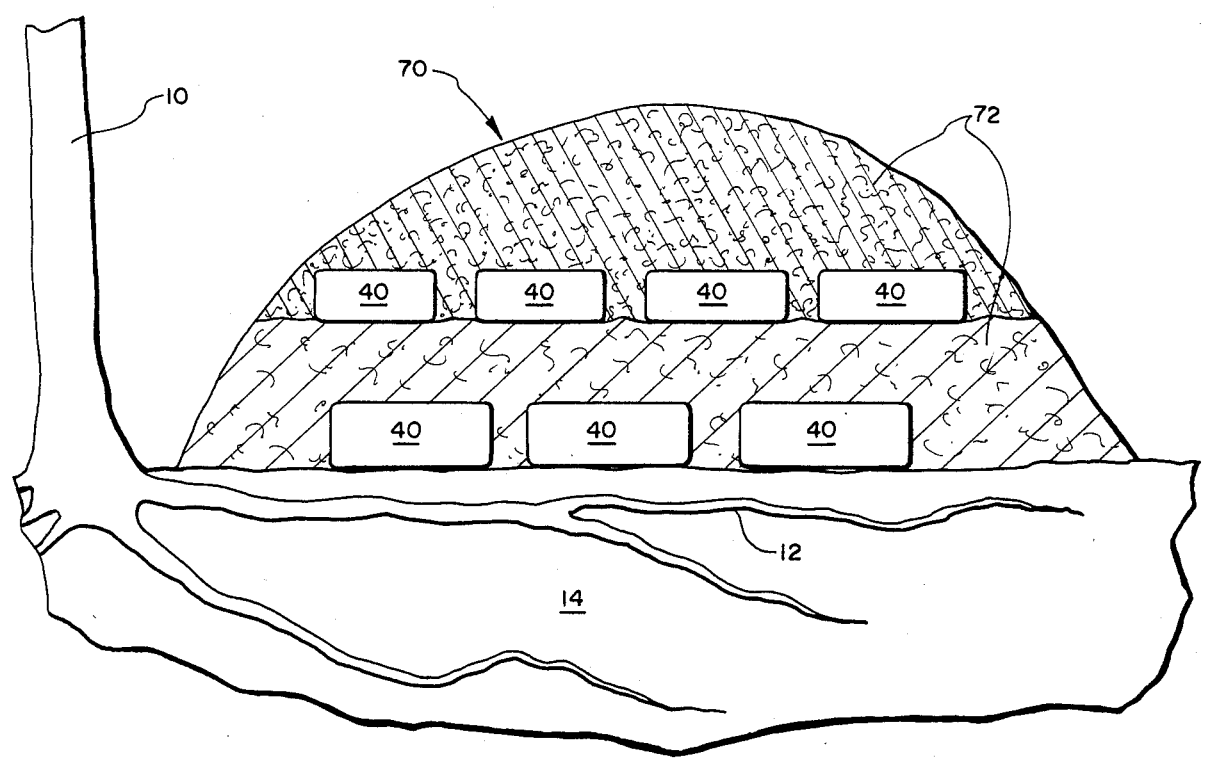
FIG. 9 is a cross-sectional illustration of a heap-type supplementary cellulosic matrix for the first package bale as it functions in association with the roots of a vector plant.

A heap-type supplementary cellulosic matrix 72 may be used in conjunction with multiple first packages 40 to provide macronutrients and micronutrients as fertilizer to an extensive plant community as illustrated in FIG. 9. Such matrix 72 has the shape of a heap 70 and consists of chipped plant matter as a layered cellulosic matrix 72 which extends the cellulosic matrix 42 of the first packages 40 and encloses multiple second packages 50. In use, green plants, chopped forest litter and other shredded and disaggregated cellulosic materials of matrix 72 are acted on when moist by bacteria and fungi with the production of nutrient organic compounds, organic acids and enzymes. With time, the acids and enzymes penetrate the first package 40 and act on rock minerals and rock phosphate 56 of the second packages 50 so as to promote the conversion of insoluble rock minerals into soluble forms. As described above, the liberated macronutrients and micronutrients enter roots 12 of one or more vector plants 10 and then move in a "radial cascade" down nutrient gradients utilizing the mycorrhizalactinomycete interplant nutrient equalization process. An additional advantage of employing a supplemental cellulosic matrix 72, is the creation of a long-term environment for extraction unit type second packages 50 whose sequestered moisture favors complete conversion of rock minerals and rock phosphate and sustains nutrient release from such second packages 50.

From the foregoing description it will be appreciated that the novel fertilizer system disclosed herein clearly overcomes many of the longstanding problems in the art by (1) providing a means for delivering soluble macronutrients and micronutrients to the root systems of an extensive perennial plant community without appreciable adsorptive loss to metals and clay minerals in the surrounding soil; (2) providing a means for extracting nutrient compounds from rock minerals, rock phosphate and rock-derived sediments without the complex commercial chemical processes of refinement; (3) providing a nutrient supply which is available to plant root systems over an extended time period; (4) providing a means for delivering macronutrients and micronutrients to plural plant root systems by means of the "radial cascade effect"; (5) providing a means for utilizing the mycorrhizal interplant nutrient equalization process to improve the overall nutrient status of a large plant community so as to transfer nutrients from "source" plants having adequate or excess nutrients to those "sink" plants deficient in nutrients; (6) providing a means for utilizing efficient fungal and bacterial microoganisms to produce glucose, enzymes and organic acids to facilitate the conversion of insoluble rock and organic minerals into soluble forms which fertilize plants; (7) providing a means for chelating certain potentially toxic metals with organic acids; and (8) providing a means for the return to the soil of nutrients contained in solid and liquid municipal wastes. In addition, the components of this system may be prepared in a form which permits storage, transport and implantation without harm to the biological agents.

The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A system for delivering soluble macronutrients and micronutrients to a plant community, the system comprising:
   a vector plant within the plant community;
   a first package comprising a support matrix, said first package being positioned on a soil surface in proximity to roots of the vector plant;
   at least one source of plant nutrients within the support matrix of the first package, said source of plant nutrients being configured such that the plant nutrients are made available to the support matrix over time; and
   a plurality of phosphorus-tolerant first microorganisms associated with both the roots of the vector plant and the plant community adjacent thereto, said first microorganisms being capable of transferring the plant nutrients from the support matrix to the roots of the vector plant and from the vector plant to the plant community.

2. A system for delivering soluble macronutrients and micronutrients to a plant community as defined in claim 1 wherein the first microorganisms comprise fungi of the family Endogonacae.

3. A system for delivering soluble macronutrients and micronutrients to a plant community as defined in claim 1 wherein the first microorganisms comprise bacteria of the family Actinomycete.

4. A system for delivering soluble macronutrients and micronutrients to a plant community as defined in claim 1 wherein the support matrix of the first package comprises a cellulosic material which is capable of both supporting said source of plant nutrients and releasing plant nutrients to adjacent plants.

5. A system for delivering soluble macronutrients and micronutrients to a plant community as defined in claim 4 wherein the cellulosic material comprises a porous substance.

6. A system for delivering soluble macronutrients and micronutrients to a plant community as defined in claim 4 wherein the cellulosic material comprises a fibrous substance.

7. A system for delivering soluble macronutrients and micronutrients to a plant community as defined in claim 1 wherein the support matrix of the first package comprises a hydrophyllic material which is capable of both supporting second microorganisms adapted to converting insoluble nutrient compounds to soluble plant nutrients and releasing plant nutrients to adjacent plants.

8. A system for delivering soluble macronutrients and micronutrients to a plant community as defined in claim 1 wherein the support matrix of the first package comprises paper.

9. A system for delivering soluble macronutrients and micronutrients to a plant community as defined in claim 1 wherein the support matrix of the first package comprises plant materials.

10. A system for delivering soluble macronutrients and micronutrients to a plant community as defined in claim 1 wherein the support matrix of the first package comprises municipal wastes.

11. A system for delivering soluble macronutrients and micronutrients to a plant community as defined in claim 1 wherein the support matrix of the first package comprises processed organic materials.

12. A system for delivering soluble macronutrients and micronutrients to a plant community as defined in claim 1 wherein the support matrix of the first package comprises natural organic materials.

13. A system for delivering soluble macronutrients and micronutrients to a plant community as defined in claim 1 wherein the source of plant nutrients comprises a concentration of soluble plant nutrients.

14. A system for delivering soluble macronutrients and micronutrients to a plant community as defined in claim 13 wherein the concentration of soluble plant nutrients is configured as a plurality of pellets and further comprising a slowly dissolving embedment material surrounding said pellets, whereby the soluble plant nutrients are released from the embedment material in a time-release manner.

15. A system for delivering soluble macronutrients and micronutrients to a plant community as defined in claim 1 wherein the source of plant nutrients comprises:
rock minerals and rock phosphates;
a plurality of second microorganisms in proximity to the rock minerals and rock phosphates, said second microorganisms producing enzyme and organic acid products which act upon the rock minerals and rock phosphates so as to produce soluble plant nutrients; and
energy-rich substrates for supporting the second microorganisms.

16. A system for delivering soluble macronutrients and micronutrients to a plant community as defined in claim 15 wherein the source of plant nutrients further comprises:
cellulose and hydrogels, said cellulose and hydrogels forming a growth environment for the second microorganisms when hydrated.

17. A system for delivering soluble macronutrients and micronutrients to a plant community as defined in claim 16 wherein the source of plant nutrients further comprises:
a plurality of cellulase microorganisms whose products are capable of converting cellulose into glucose.

18. A system for delivering soluble macronutrients and micronutrients to a plant community as defined in claim 1 further comprising cellulosic materials surrounding the first package as a heap.

19. A method for fertilizing a plant community which has a symbiotic relationship with a plurality of phosphorus-tolerant microorganisms, the method comprising the steps of:
supporting at least one source of plant nutrients within a matrix of a first package such that the plant nutrients are made available to the matrix over time;
placing said first package on a soil surface in proximity to roots of a vector plant which has a symbiotic relationship with said phosphorus-tolerant microorganisms, the vector plant being interconnected by the microorganisms with the plant community; and
exposing the first package to moisture, whereby the plant nutrients are transferred from the matrix of the first package to the roots of the vector plant and from the vector plant through the microorganisms to the plant community.

20. A method as defined in claim 19 wherein the placing step is preceded by the step of drying the first package so as to prevent the loss of plant nutrients.

21. A method as defined in claim 19 wherein the placing step is preceded by the step of cooling the first package so as to prevent the loss of plant nutrients.

* * * * *

UNITED STATES PATENT AND TRADEMARK OFFICE
CERTIFICATE OF CORRECTION

PATENT NO. : 4,581,846
DATED : April 15, 1986
INVENTOR(S) : Larry J. Stensaas

It is certified that error appears in the above-identified patent and that said Letters Patent is hereby corrected as shown below:

Column 1, line 11, "06.641,341" should be --06/641,341--
Column 4, line 62, "effect" should be --affect--
Column 6, line 35, "specialized, contacts" should be --specialized contacts--
Column 7, line 44, "hydrogen 59" should be --hydrogel 59--
Column 8, line 36, "time-release manner" should be --time-released manner--
Column 9, lines 37-38, "mycorrhizalactinomycete" should be --mycorrhizal-actinomycete--

Signed and Sealed this

Eighth Day of July 1986

[SEAL]

Attest:

DONALD J. QUIGG

Attesting Officer

Commissioner of Patents and Trademarks